United States Patent Office 3,370,739
Patented Feb. 27, 1968

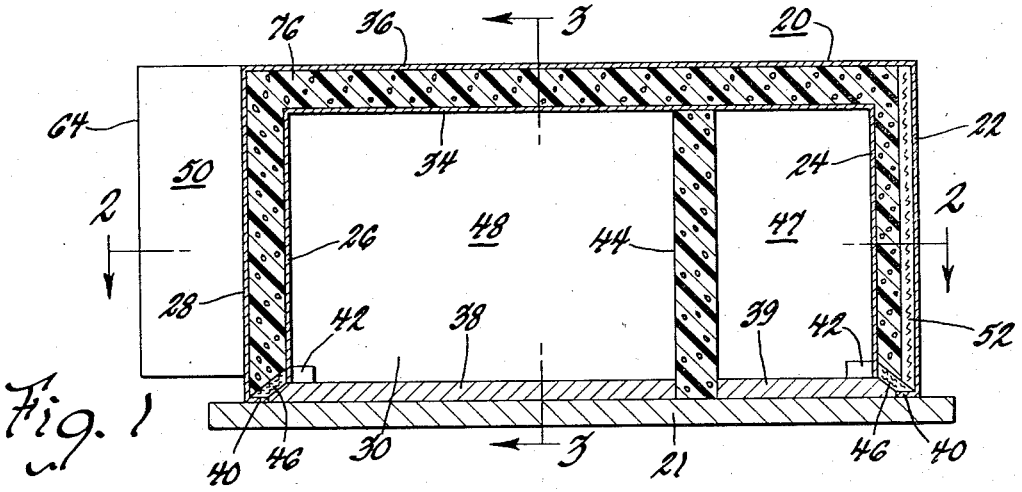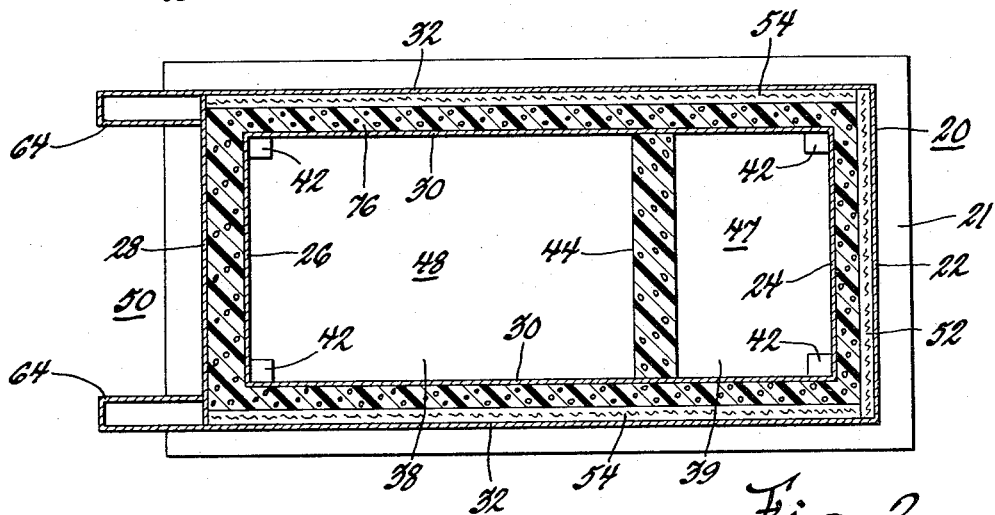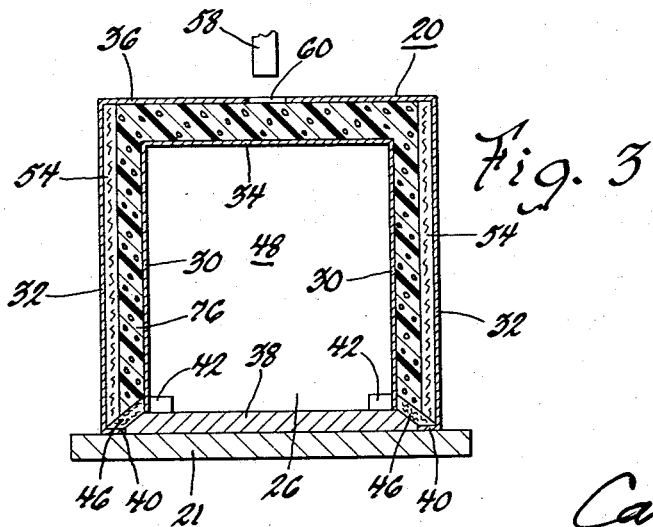

3,370,739
REFRIGERATING APPARATUS
Paul B. Burrus, Lebanon, and John C. Rill, Jr., Dayton, Ohio, assignors to General Motors Corporation, Detroit, Mich., a corporation of Delaware
Filed July 12, 1965, Ser. No. 471,047
2 Claims. (Cl. 220—9)

ABSTRACT OF THE DISCLOSURE

In the preferred form, the top and side outer walls of the refrigerator cabinet are lined with thin batts of resilient glass fiber insulation prior to the pouring of the foam into the remaining insulation space of the cabinet. The distortion of the top and side walls from the expansion of the foam forming insulation material is prevented by the easy compression of the bats of resilient glass fiber insulation.

---

This application pertains to refrigerating apparatus and more particularly to an insulating arrangement which prevents distortion of the walls during the application of foam insulation to refrigerator cabinets.

For many years glass fiber insulation was the standard insulation for refrigerating cabinets. More recently polyurethane foamed with a volatile liquid was developed and has become more effective, more versatile, more useful and lower in cost so that its material cost relative to its insulation value is now competitive with glass fiber insulation. However, the use of polyurethane foam insulation has been impeded by the expansion pressures of the foam upon the walls when it is cast in the insulation space. These pressures distort the walls of the space requiring the use of expensive heavy jigs and fixtures to prevent this distortion.

It is an object of this invention to avoid the need for expensive jigs and fixtures in the casting of foam insulation in an insulation space.

It is another object of this invention to prevent the distortion of the outer finish wall of the foam insulated cabinet without the use of expensive jigs and fixtures.

It is another object of this invention to provide a thin highly resilient crushable material between the insulation space provided for the foam material and the outer finish walls of the insulated walls or the insulated space of the insulated cabinets to absorb the expansion of the foam forming material to prevent the distortion of the outer finish walls of the cabinet.

These and other objects are attained in the form shown in the drawings in which the interior of the cabinet is divided into a below freezing compartment and an above freezing compartment by an insulated partition. In a refrigerator cabinet the distortion of the top and side walls must be prevented since these are normally exposed to view and any distortion thereof would make the cabinet readily appear to be defective. The remaining walls such as the back and bottom walls, are not critical since they are normally not exposed to view. We therefore line the top and side walls of the cabinet with thin bats of resilient glass fiber insulation which is not substantially penetrated by the foam forming material. The foam forming material is poured into and fills the remaining insulation space of the refrigerator cabinet. The distortion of the top and side walls is prevented by the ease in which the resilient glass fiber insulation is compressed. This compression absorbs the pressures created by the expansion of the foam forming materials during the critical portion of their congealing period. Through this, the need for jigs and fixtures to prevent distortion is eliminated.

Further objects and advantages of the present invention will be apparent from the following description, reference being had to the accompanying drawings wherein preferred embodiments of the present invention are clearly shown.

In the drawings:

FIGURE 1 is a vertical sectional view through a refrigerator cabinet embodying my invention located in the face down position and shown at the conclusion of the foaming step;

FIGURE 2 is a transverse sectional view taken along the lines 2—2 of FIGURE 1; and FIGURE 3 is a sectional view taken along the lines 3—3 of FIGURE 1.

Referring now to the drawings and particularly to FIGURES 1 and 2, there is illustrated a refrigerator cabinet 20 which is mounted in a face down position upon a horizontal supporting platform 21. The cabinet includes outer and inner top walls 22 and 24, outer and inner side walls 32 and 30, inner and outer bottom walls 26 and 28, and inner and outer back walls 34 and 36. The inner walls 24 and 26, 30 and 34 are preferably joined together to form an inner liner which may be of sheet metal or sheet plastic. The outer metal walls 22, 32, 28 and 36 are joined to the extended walls 64 which form the support at the bottom of the cabinet to provide an outer sheet metal shell with the machinery compartment 50 beneath.

According to our invention, we first line the top and side walls 22 and 32 with thin bats 52 and 54 of resilient glass fiber insulation. These bats may be packed in the outer shell well enough to hold their position during the turning of the cabinet and the pouring of the foam. However, if these bats do not hold their position merely by packing them in against the inner surfaces of the outer walls 22 and 32, these walls may be provided with any suitable adhesive prior to placing the bats 52 and 54 in contact with them. The inner liner composed of the inner walls 24, 26, 30 and 34 may be first placed upon the platform 21 and located by the corner blocks 42. The platform 21 is preferably provided with two islands 38 and 39 having vertical walls in the space between them and having beveled edges on their remaining sides surrounding the inner liner. There are provided glass fiber sealing strips 46, or breaker strips extending between the adjacent edges of the inner liner and outer shell. If desired, the outer shell may be provided with an inturned flange 40 within which the glass fiber strips or breaker strips 46 may be mounted. The insulation partition 44 is slidably mounted within the inner liner and fits in the slot between the islands 38 and 39 upon the platform 21. The partion 44 divides the interior of the inner liner into a below freezing compartment 47 and an above freezing compartment 48. After the inner liner is placed face down upon the platform 21, and after the resilient bats of glass fiber insulation 52 and 54 are packed in place and the strips 46 are in place, the outer shell composed of the outer walls 22, 28, 32 and 36 is telescoped over the inner liner upon the platform 21 and into the position shown in FIGURE 1 with the flange 40 resting upon the platform 21 surrounding and being located by the islands 38 and 39.

The insulation of the cabinet 20 is completed in this position by the introduction of the foam forming material into the remaining insulation space between the inner and outer walls. This may be done by pouring the foam forming materials from a nozzle 58 through a central opening 60 or through distributed opening in the back wall 36 as is more fully disclosed in Patent 3,137,744, issued June 16, 1964, or Patent 3,172,925, issued Mar. 9, 1965, or British Patent 975,080, published Nov. 11, 1964. Preferably polyurethane foam with volatile liquid as a blowing agent as described in these patents is preferably used as the foam forming material. The foam forming material foams within the unoccupied insulation space forming the foam insulation 76 in the rear, bottom, side and top walls. The volatile liquid forms the polyurethane material into contact with the surfaces of the resilient bats 52 and 54 as well as the remaining walls until the entire remaining space between the walls is filled. At an intermediate point in the congealation of the polyurethane, the foam begins to exert substantial expansion pressures. Instead of distorting the outer walls of the cabinet, these expansion pressures will be absorbed by the ease of compression of the glass fiber insulation 52 and 54. This is accomplished without any substantial pressure on the walls and particularly the outer finish walls 22 and 32. The back wall 36 and the bottom wall 28 may distort some but this distortion is not great and is not sufficient to be objectionable since these wall surfaces are not normally viewed. Instead of glass fiber insulation for the bats 52 and 54, there may be used other materials having similar properties. By this insulating arrangement and this method of insulation, the use of jigs and fixtures are avoided and the insulation of the cabinet is made more simple and less expensive.

While the embodiments of the present invention as herein disclosed, constitute preferred forms, it is to be understood that other forms might be adopted.

What is claimed is as follows:

1. A refrigerator cabinet having top, bottom, side and back inner and outer walls spaced from each other to provide an insulating space therebetween, a thin layer of easily compressed insulating material within said insulation space lining the outer top and side walls, and an organic resin foam insulation formed in situ throughout the remainder of the insulation space contacting and compressing said easily compressed insulating material in its expansion during the foaming of the resin, said easily compressed insulating material being under varying amounts of compression in various areas thereof and preventing distortion of the top and side walls.

2. A refrigerator cabinet as defined in claim 1 in which the easily compressed material comprises resilient glass fibers.

References Cited
UNITED STATES PATENTS

| | | | |
|---|---|---|---|
| 2,728,702 | 12/1955 | Simon et al. | 220—9 |
| 2,863,797 | 12/1958 | Meyer | 220—9 |
| 2,962,183 | 11/1960 | Rill et al. | 220—9 |
| 3,147,878 | 9/1964 | Wissmiller | 220—9 |
| 3,174,642 | 3/1965 | Loewenthal et al. | 220—9 |
| 3,240,029 | 3/1966 | Wurty | 220—9 |
| 3,294,462 | 12/1966 | Kesling | 220—9 |

THERON E. CONDON, *Primary Examiner.*

JAMES R. GARRETT, *Examiner.*